United States Patent
Nagel et al.

(10) Patent No.: US 6,906,854 B1
(45) Date of Patent: Jun. 14, 2005

(54) SYSTEM AND METHOD FOR CONTROLLING NOISE IN RAMAN AMPLIFIERS

(75) Inventors: Jonathan A. Nagel, Brooklyn, NY (US); Sergey Y. Ten, Horseheads, NY (US); Carl A. B. Clausen, Red Bank, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 163 days.

(21) Appl. No.: 10/099,102

(22) Filed: Mar. 14, 2002

Related U.S. Application Data

(60) Provisional application No. 60/276,427, filed on Mar. 16, 2001, provisional application No. 60/276,342, filed on Mar. 16, 2001, and provisional application No. 60/276,426, filed on Mar. 16, 2001.

(51) Int. Cl.[7] .................................................. H01S 3/00
(52) U.S. Cl. .............................. 359/337.11; 359/341.4; 359/341.3
(58) Field of Search ........................... 359/334, 337.11, 359/341.3, 341.4; 398/37

(56) References Cited

U.S. PATENT DOCUMENTS

| | | | | |
|---|---|---|---|---|
| 6,016,213 A | * | 1/2000 | Farber et al. | 398/177 |
| 6,055,092 A | * | 4/2000 | Sugaya et al. | 359/337 |
| 6,108,123 A | * | 8/2000 | Kinoshita | 359/337 |
| 6,388,806 B1 | * | 5/2002 | Freeman et al. | 359/341.3 |
| 6,512,628 B1 | * | 1/2003 | Terahara et al. | 359/334 |
| 6,525,873 B2 | * | 2/2003 | Gerrish et al. | 359/341.4 |
| 6,542,233 B1 | * | 4/2003 | Bray et al. | 356/324 |
| 6,611,370 B2 | * | 8/2003 | Namiki et al. | 359/334 |
| 6,614,589 B2 | * | 9/2003 | DeGrange et al. | 359/341.4 |
| 6,714,343 B2 | * | 3/2004 | Goobar et al. | 359/337 |
| 2001/0033413 A1 | * | 10/2001 | Lelic et al. | 359/341.4 |

* cited by examiner

*Primary Examiner*—Thomas H. Tarcza
*Assistant Examiner*—Deandra M. Hughes

(57) ABSTRACT

A system and method for controlling noise in a Raman amplifier including a plurality of pumps. A control system provides one or more control signals in response to an amplifier input or output signal. Pump parameters are adjusted in response to the control signals to achieve a desired noise figure characteristic.

22 Claims, 4 Drawing Sheets

SYSTEM AND METHOD FOR CONTROLLING NOISE IN RAMAN AMPLIFIERS

CROSS-REFERENCE TO RELATED APPLICATIONS

The present application claims the benefit of U.S. provisional application Nos. 60/276,427, 60/276,342, and 60/276,426 each filed Mar. 16, 2001, the teachings of which are incorporated herein by reference.

FIELD OF THE INVENTION

This invention relates in general to optical communication systems, and in particular to a system and method for controlling noise in optical amplifiers.

BACKGROUND OF THE INVENTION

Optical amplifiers may be utilized in optical communication networks, especially long-haul networks of lengths between 600 kilometers and 10,000 kilometers, to compensate for optical losses. Optical amplifiers amplify an input optical signal without converting it into electrical form. They include rare earth doped fibers such as erbium doped fiber amplifiers (EDFAs) and Raman amplifiers.

An EDFA operates by passing an optical signal through an erbium-doped fiber segment, and "pumping" the segment with light from another source such as a laser. Raman amplification occurs throughout an optical transmission fiber when the transmission fiber is pumped at an appropriate wavelength or wavelengths. Gain is then achieved at a longer wavelength through the process of Stimulated Raman Scattering. The difference between the Raman amplifier pumped wavelength and the associated amplified wavelength spectrum at the longer wavelength is referred to as a "Stokes shift." The Stokes shift for a typical silica fiber is approximately 13 THz. Hence, Raman amplifiers provide amplification of an optical signal without the need for a specially doped fiber, such as used in an EDFA.

Signal degradation in optical communication systems due to noise is largely unavoidable. There are various types of noise such as thermal noise, shot noise, modal noise, and mode partition noise. In optical systems utilizing optical amplifiers, each optical amplifier is also a source of noise. The noise figure F for an optical amplifier gives an indication of the degradation in a transmitted signal owing to that amplifier, and is based on a ratio of the input signal-to-noise ratio to the output-signal-to-noise ratio. Thus, an amplifier exhibiting a relatively large noise figure can negatively affect signal detection and system reliability.

In addition, some optical systems, such as WDM and DWDM systems, transmit a plurality of channels over a range of wavelengths. In such systems, any "ripples" due to an uneven noise figure can also negatively affect signal detection and system reliability. Such "ripples" may also be cumulative if successive optical amplifiers exhibit similar noise figures.

Accordingly, there is a need for an optical amplifier configuration and method that overcomes the deficiencies of the prior art by providing a desired noise figure across a transmitted range of wavelengths.

BRIEF SUMMARY OF THE INVENTION

An amplifier consistent with the invention includes a plurality of pumps and a control system. The pumps establish an amplifier noise figure characteristic. The control system is configured to receive a signal representative of a signal-to-noise ratio and to provide at least one control signal to at least one of the pumps in response to the signal. The control signal causes adjustment of at least one adjustable parameter of the pump to achieve a desired noise figure characteristic for the amplifier. An optical communication system consistent with the invention includes a transmitter for transmitting an optical signal on an optical information channel and an amplifier consistent with the invention coupled to the information channel.

A method of obtaining a desired noise figure characteristic for an optical amplifier including a plurality of pumps consistent with the invention includes: detecting a signal representative of a signal-to-noise ratio; generating at least one control signal in response to the signal; and adjusting at least one adjustable parameter of at least one of the pumps in response to the control signal to achieve the desired noise figure characteristic.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
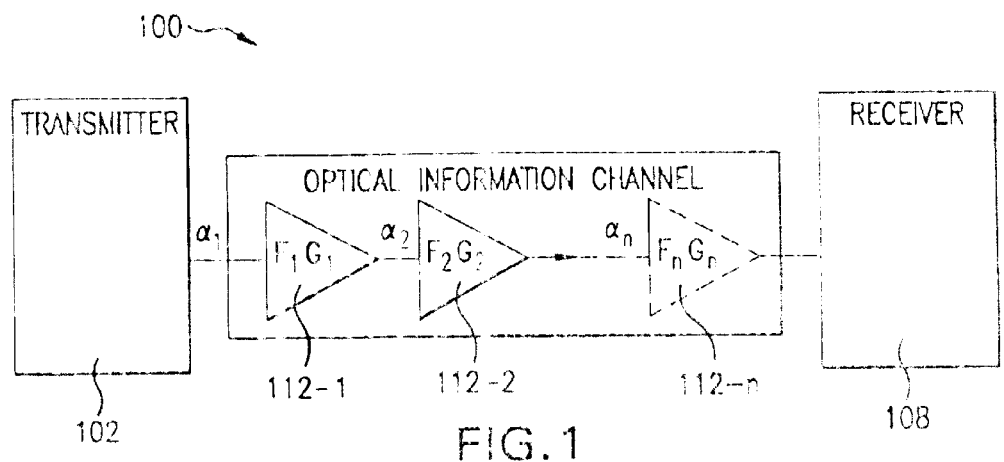
FIG. 1 is a block diagram of an exemplary optical communication system consistent with the present invention.

Turning now to FIG. 1, there is illustrated an exemplary optical communication system 100 consistent with the present invention. Those skilled in the art will recognize that the system 100 has been depicted as a highly simplified point-to-point system for ease of explanation. Also, it is to be understood that the present invention is not limited to the illustrated exemplary embodiments described herein. In fact, the present invention may be incorporated into a wide variety of optical networks, systems and devices without departing from the spirit and scope of the invention.

The optical communication system 100 includes a transmitter 102 and a receiver 108 connected via an optical information channel or optical path 106. At the transmitter, data may be modulated on a plurality of optical wavelengths for transmission over the optical information channel 106. Depending on system characteristics and requirements, the optical information channel 106 may include an optical fiber waveguide, optical amplifiers 112-1, 112-2, . . . 112-n, regenerators, optical filters, dispersion compensating modules, and other active and passive components. A variety of configurations for each of these elements will be known to those skilled in the art.

For clarity, only optical amplifiers 112-1, 112-2, ... 112-n are illustrated in FIG. 1. The first optical amplifier 112-1 may have an associated power gain $G_1$ and noise figure $F_1$. Similarly, the second optical amplifier may have an associated power gain $G_2$ and noise figure $F_2$. Thus, the noise figure $F_k$ for the kth optical amplifier is given by equation 1 below, where $(S/N)_{k,in}$ is the input signal-to-noise ratio of the kth optical amplifier for a shotnoise limited input signal, and $(S/N)_{k,out}$ is the output signal-to-noise ratio of the kth amplifier.

$$F_k = \frac{(S/N)_{k,in}}{(S/N)_{k,out}} \qquad (1)$$

The larger the noise figure, the larger the noise added to the signal by the amplifier. The noise figure is wavelength dependent, so that even with the same signal powers, it is possible to have different signal-to-noise ratios over a range of transmitted wavelengths.

The optical amplifiers 112-1, 112-2, ... 112-n may include a plurality of Raman amplifiers. The Raman amplifiers may be spaced by a number of kilometers, e.g. 50 kilometers or more, depending on system characteristics and requirements. Advantageously, the Raman amplifiers are configured, in a manner to be described in greater detail below, to provide a desired noise figure. This noise figure may ideally be substantially flat over the range of transmitted wavelengths.

Figure 2:
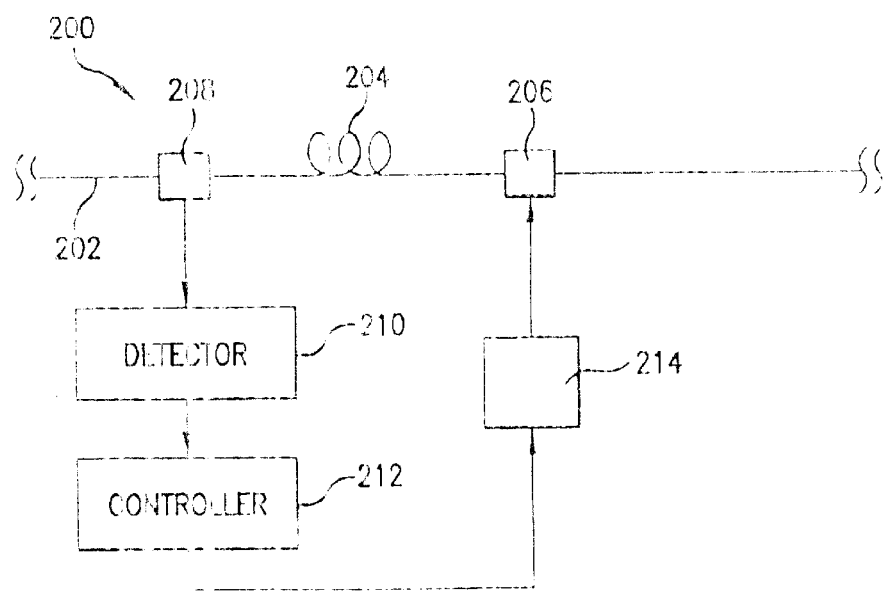
FIG. 2 is a block diagram of an exemplary Raman amplifier configuration consistent with the invention including a control system.

Turning to FIG. 2, there is illustrated a block diagram of an exemplary Raman amplifier configuration 200 for providing a desired noise figure consistent with the invention. The Raman amplifier 200 includes a fiber transmission path segment 204 in which Raman gain is to be generated by coupling energy from a pump source 214 through a coupler 206. The pump source 214 may include a plurality of pumps provided in a wide variety of configurations. A number of pump sources are known to those skilled in the art, including, for example, laser pump sources. A variety of couplers 206 for combining the pump energy and injecting the pump wavelengths into the transmission fiber 204 are also known, e.g. optical couplers or a pump multiplexer. A separate coupler may be provided for each pump or, as shown, a single coupler 206 may be provided for injecting a plurality of pumped wavelengths into the transmission fiber 204. The input data modulated on a plurality of transmission wavelengths may be inserted at 202.

Advantageously, a control system, which will later be more fully described, including a splitter 208, a detector 210, and a controller 212 is configured to provide control of noise for the Raman amplifier 200. This is accomplished by taking advantage of the fact that the noise figure for a particular Raman amplifier is a function of the pump parameters, e.g. pump wavelength and power. In this configuration, the control system detects a signal representative of the noise figure in segments of the backward-propagating wavelength spectrum at the input of the amplifier. Based on this detected signal, the amplifier pumps are dynamically adjusted to obtain a desired noise figure. A feed-forward control path must be provided from the input of the transmission fiber 204 to the pumps at 214.

In the illustrated exemplary embodiment 200, the splitter 208 directs some portion of the total optical power in the backward-propagating spectrum, e.g. 2%, to the detector 210. The detector detects the relative noise value in various segments of the transmitted spectrum and provides a signal representative of the effective noise figure in each spectral segment to the controller 212. In a manner to be described in greater detail below, the controller 212 adjusts the parameters of the amplifier pumps in response to the signals from the detector in order to obtain a desired noise figure for the exemplary Raman amplifier 200. Those skilled in the art will recognize that splitter 208 may take a variety of configurations including a 1%, 5%, or 10% splitter, a WDM coupler, or an isolator and wavelength selective refractor. In this configuration, a feed-forward path is employed and the controller may be located as indicated at 212 or alternatively next to the pumps at 214.

Figure 3A:
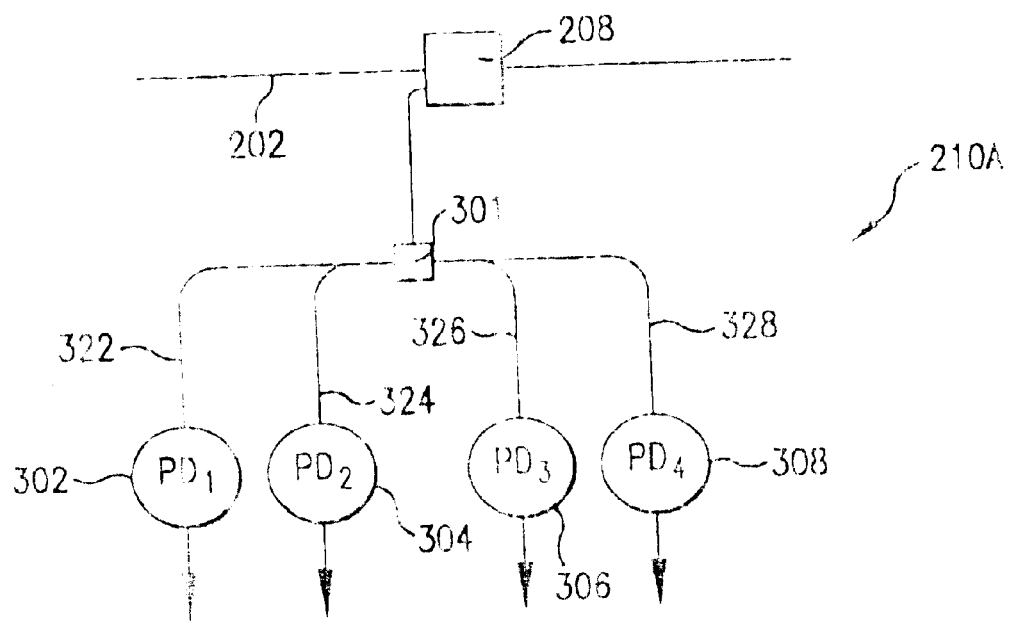
FIGS. 3A, 3B, and 3C illustrate three separate exemplary embodiments for a detector useful in the exemplary Raman amplifier configuration of FIG. 2.

The detector 210 may also be provided in various embodiments. FIG. 3A illustrates one exemplary embodiment of a detector 210A useful in connection with the present invention. The detector 210A includes a demultiplexer 301 configured to receive a portion of the backward-propagating noise spectrum from the splitter 208, and to divide that signal into a plurality of spectral segments at associated wavelength ranges. The wavelength ranges may be substantially equal in length. For example, the transmitted spectrum for an exemplary WDM system may include a plurality of channels in a range of C-band wavelengths from about 1520 nm to 1560 nm. In this case, the demultiplexer 301 may split the spectrum into four spectral segments from 1520 nm–1530 nm, 1530 nm–1540 run, 1540 nm–1550 nm, and 1550 nm –1560 nm.

Each of the spectral segments from the demultiplexer may be provided on an associated path 322, 324, 326, 328 to an associated photo-detector 302, 304, 306, 308. Each photo-detector 302, 304, 306, 308 is configured to provide an output signal representative of the light imparted thereon. Thus, the relative backward-propagating noise level in each of the spectral segments is represented by the outputs of the photo-detectors.

As will be described in greater detail below, the outputs of the photo-detectors are provided to the controller, which adjusts the amplifier pumps to obtain a desired noise figure for the optical amplifier 200. The number of spectral segments provided by the demultiplexer for detection by the photo-detectors directly affects the ability of the control system to obtain a desired noise figure. Thus, although four photo-detectors are illustrated in the detector 210A, those skilled in the art will recognize that two or more photo-detectors may be used.

Figure 3B:
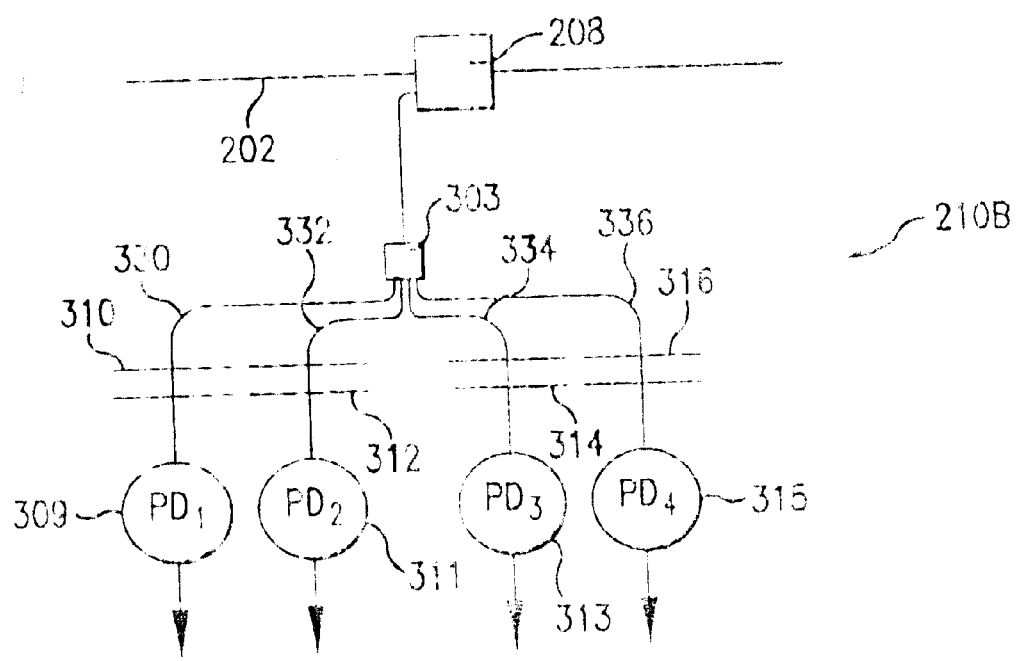

FIG. 3B illustrates another exemplary embodiment 210B of a detector useful in connection with the present invention. The detector 210B includes a splitter 303 and a plurality of optical filters 310, 312, 314, 316. The splitter 303 receives a portion of the backward-propagating noise spectrum from the splitter 208 and splits the received portion onto a plurality of paths 330, 332, 334, 336, each of which is coupled to an associated filter 310, 312, 314, 316. The transmittance characteristic of each filter is configured so that each filter transmits an associated segment of the transmitted spectrum to an associated photo-detector. Again, the spectral segments transmitted by the filters should be substantially equal in length. Also, the transmittance characteristics for each filter should be narrow enough to not overlap with other filters.

For example, in a WDM or DWDM system with channels at wavelengths in the C-Band from about 1520 nm to 1560 mm, the first optical filter 310 may pass the segment of the wavelengths from 1520 nm–1530 nm, the second optical filter 312 may pass the segment from 1530 nm–1540 nm, the third optical filter 314 may pass the segment from 1540 nm–1550 nm, and the fourth optical filter 316 may pass the segment from 1550 nm–1560 mm. Again, each spectral segment is provided to an associated photo-detector 309, 311, 313, 315, each of which provides a representative of the backward-propagating noise in the segment imparted thereon. Although four filters and photo-detectors are illustrated in FIG. 3B, those skilled in the art will recognize that two or more filters and associated photo-detectors may be used.

Figure 3C:
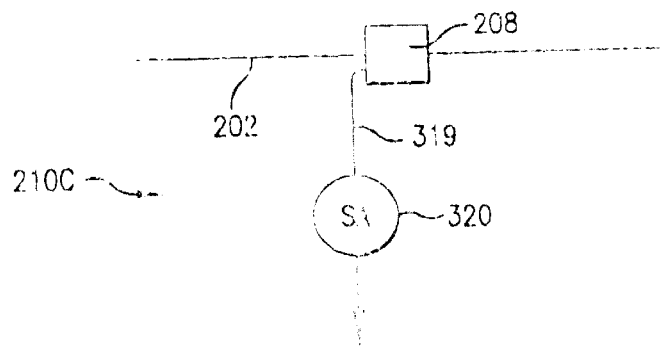

FIG. 3C illustrates yet another embodiment 210C of a detector useful in connection with the present invention. The embodiment 210C includes a known spectrum analyzer 320. In this instance, the spectrum analyzer 320 may be utilized to detect the backward-propagating noise spectrum and provide an output signal to the controller representative of the noise figure in various segments of the transmitted spectrum. The controller modifies the amplifier pump parameters in response to the spectrum analyzer output to achieve a desired amplifier noise figure.

In one embodiment, detector 210 may detect and deliver to the controller 212, a number M of detected signals, each being associated with a different segment of the transmitted spectrum. The number M may be greater than or equal to the total number N of pump control parameters. Pump control parameters include the adjustable variables for each Raman pump, which may include power and/or wavelength. For example, in an embodiment consistent with the invention that includes four pumps, each including two adjustable control parameters, e.g. wavelength and power, then the total number of pump parameters would be eight. The number M of detected signals may be greater than or equal to eight. The controller 212 includes a control algorithm to accept the M detected signals and deliver a corresponding number of control signals for initiating adjustments to one or more of the N pump parameters to achieve a desired noise figure. This algorithm may be based on empirical investigation of the noise figure exhibited by the amplifier in each spectral segment in response to variations in pump parameters.

Figure 4:
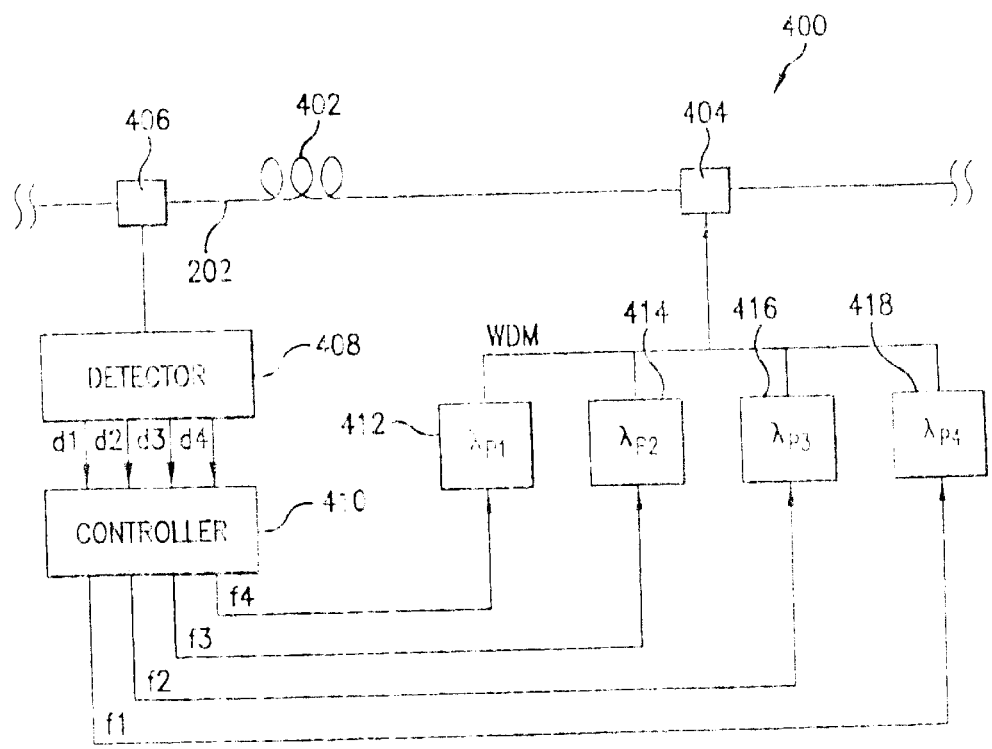
FIG. 4 is a block diagram of an exemplary Raman amplifier consistent with the invention including four pumps and a control system.

Turning to FIG. 4, there is provided a block diagram of an exemplary Raman amplifier configuration 400 consistent with the invention. The configuration 400 includes four pumps 412, 414, 416, 418 and a feed-forward control system. The basic operation of FIG. 4 is similar to that previously described in reference to FIG. 2. Those skilled in the art will recognize that each of the four pumps 412, 414, 416, 418 will generate an associated pump gain characteristic. Each pump may have its own pump parameters that may be controlled by feed-forward signals $f_1$, $f_2$, $f_3$, $f_4$ from the controller 410. Each pump may be pumped at a different associated wavelength $\lambda_{P1}$, $\lambda_{P2}$, $\lambda_{P3}$, and $\lambda_{P4}$ and/or output powers. The detector 408 in the exemplary Raman amplifier configuration 400 may be a four-way splitter with four filters, as illustrated, for example, in FIG. 3B.

Figure 5A:
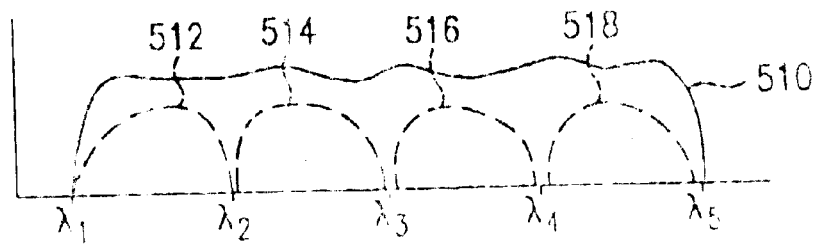
FIG. 5A is an exemplary plot of a backward propagating noise spectrum associated with the Raman amplifier configuration of FIG. 4.
Figure 5B:
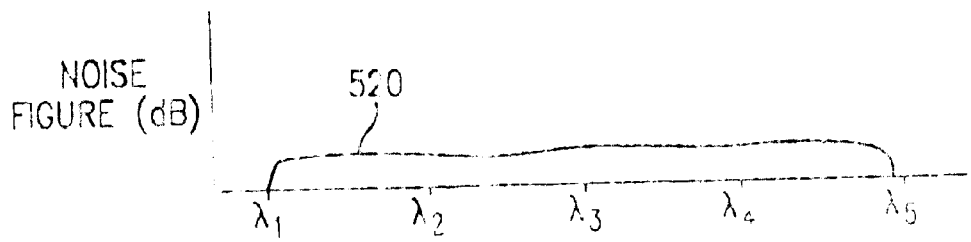
FIG. 5B is an exemplary plot of noise figure versus wavelength associated with the Raman amplifier configuration of FIG. 4.
Figure 5C:
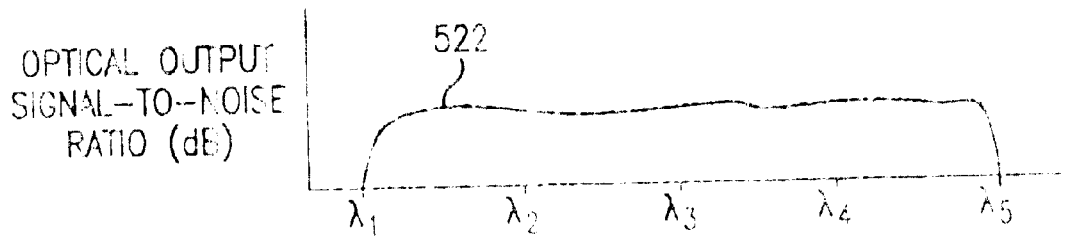
FIG. 5C is an exemplary plot of an output signal-to-noise ratio versus wavelength resulting from difference between the exemplary plot of FIG. 5A and FIG. 5B.

Turning to FIGS. 5A to 5C, exemplary plots of the backward-propagating noise spectrum 510, noise FIG. 520, and output signal-to-noise ratio 522 are illustrated.

As illustrated in FIG. 5A, the backward-propogating noise spectrum 510 may exhibit some "ripple" over the range of transmitted wavelengths, negatively affecting signal detection and reliability. The filters in the detector 408 split the transmitted spectrum, and hence the backward-propogating noise spectrum 510, into associated segments. The first filter may exhibit a transmittance characteristic 512 to allow a first spectral segment, between $\lambda_1$ and $\lambda_2$, of the transmitted signal to pass. Similarly, the second filter may exhibit a transmittance characteristic 514 to allow a second spectral segment between $\lambda_2$ and $\lambda_3$ to pass, the third filter may pass a third spectral segment between $\lambda_3$ and $\lambda_4$, and the fourth filter may pass a fourth spectral segment between $\lambda_4$ and $\lambda_5$. Even though four spectral segments are illustrated, those skilled in the art will recognize that the transmitted spectrum may be divided into two or more spectral segments without departing from the scope of the present invention. Generally, the more spectral segments used, the greater the ability to more finely tune the amplifier noise figure. Of course, the number of segments may be dictated by system characteristics, as well as cost considerations.

An associated photo-detector detects a signal representative of the backward-propagating noise for each spectral segment, and provides an output signal representative thereof. The output signals are coupled to the controller 410, which adjusts the amplifier pump parameters in response to the detector outputs to achieve a desired noise figure as illustrated, for example, in FIG. 5B. The plot 520 of the desired noise figure for a particular Raman amplifier may be substantially flat over the range of transmitted wavelengths.

Also, to the extent that Raman amplifiers are added to the communication system, the noise figure for succeeding Raman amplifiers may be chosen to at least partially compliment the accumulated input signal-to-noise ratio from the sum of all the preceding components. As such, the shape of the output signal-to-noise ratio may improve with each additional Raman amplifier. That is, the shape of the output signal-to-noise ratio may exhibit less "ripples" over the range of transmitted wavelengths. In addition, as the output signal-to-noise ratio reaches a substantially flat shape over the range of wavelengths to be amplified, each corresponding Raman amplifier may be controlled to produce a maximally flat noise figure.

FIG. 5C illustrates an exemplary plot 522 of the output optical signal-to-noise ratio over the transmitted range of wavelengths. Advantageously, a controller consistent with this invention may continuously monitor the output signal-to-noise ratio to ensure that the noise figure for the Raman amplifier for each spectral segment remains at a desired level, e.g. a complimentary level, despite changing operating conditions.

As those skilled in the art will recognize, pump gain characteristics from each pump 412, 414, 416, 418 typically tend to overlap each other. The transmittance characteristics 512, 514, 516, 518 of the filters may thus overlap wavelengths encompassed by two or more of the pump gain characteristics. Advantageously, a controller 410 consistent with the present invention may be linked to take into account these overlapping affects. A linked control algorithm may be structured several ways. First, the control algorithm may utilize a global approach. This global approach uses detector signals, e.g. $d_1$, $d_2$, $d_3$, $d_4$, to develop a Raman amplifier model. The model computationally selects N pump parameters to give the desired noise figure and communicates this to the pumps 412, 414, 416, 418 via associated control signals $f_1$, $f_2$, $f_3$, $f_4$.

Another approach is a strongly linked iterative approach. In this approach, the N pump parameters are perturbed, and then the detector produces detector signals $d_1$, $d_2$, $d_3$, $d_4$, each of which is representative of the noise figure in an associated one of the segments. A number of corrections equal to the pump parameters N is then computed and simultaneously applied. A somewhat similar approach is a weakly linked iterative approach. In this approach, the first pump parameter is perturbed and then the detector produces signals $d_1$, $d_2$, $d_3$, $d_4$. A second pump parameter correction is then calculated and applied. All detected signals are then read again, and the third pump parameter correction is then calculated and applied. Similarly, the process continues in an iterative fashion for each pump parameter until all pump parameters for all pumps are corrected and applied.

Yet another approach is a dithering approach. In this approach, each of the N pump parameters is dithered at N different frequencies. Dithering is a process known to those skilled in the art of vibrating or quivering the frequency about its initial value. The detector signals are then decompressed or filtered at the N dithered frequencies. The recovered signal at the dithered frequency is used to control the pump parameters.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An optical amplifier comprising:

a plurality of pumps configured to produce an amplifier noise figure characteristic; and a control system optically communicating with said pumps, said control system comprising a detector configured to receive a signal representative of a backward-propagating noise spectrum and provide a plurality of detected signals, each of said detected signals being representative of the noise in an associated spectral segment of said signal representative of said backward-propagating noise signal, said control system further comprising a controller configured to provide a plurality of control signals in response to said detected signals, each of said control signals being provided to an associated one of said pumps to cause adjustment of at least one adjustable parameter of at least one of said pumps to achieve a desired wavelength-dependent noise figure characteristic and a desired output signal-to-noise ratio for a given input signal-to-noise ratio.

2. The amplifier of claim 1, wherein said at least one adjustable parameter comprises an output wavelength of said at least one of said pumps.

3. The amplifier of claim 1, wherein said at least one adjustable parameter comprises an output power of said ax least one of said pumps.

4. The amplifier of claim 1, wherein said signal representative of said backward-propagating noise spectrum comprises a range of wavelengths, and wherein said desired noise figure characteristic encompasses said range of wavelengths.

5. The amplifier of claim 1, wherein said signal representative of said backward-propagating noise spectrum comprises a range of wavelengths between about 1520 mm and about 1560 nm, and wherein said desired noise figure characteristic encompasses said range of wavelengths.

6. The amplifier of claim 1, wherein said detector comprises a spectrum analyzer.

7. The amplifier of claim 1, wherein the number of said control signals is greater than or equal to a total number of said adjustable parameters for said plurality of pumps.

8. The amplifier of claim 1, wherein said spectral segments are substantially equal in length.

9. The amplifier of claim 1, wherein said desired noise figure characteristic establishes a constant noise figure in each of said spectral segments.

10. The amplifier of claim 1, wherein sad detector comprises a splitter for splitting said signal representative of said backward-propagating noise spectrum onto a plurality of paths, each of said paths being coupled to an associated filter, each of said filters being configured to provide a different one of said associated spectral segments to an associated photo-detector, said photo detectors each providing an associated one of said detected signals.

11. The amplifier of claim 1, wherein said detector comprises a demultiplexer for separating said signal representative of said backward-propagating noise spectrum into said spectral segments, each of said segments being provided on an associated optical path coupled to an associated photo-detector, said photo detectors each providing an associated one of said detected signals.

12. An optical communication system comprising:

a transmitter configured to transmit a plurality of optical signals, each at one of a plurality of wavelengths, over an optical information channel, said optical information channel comprising an optical amplifier, said amplifier comprising:

a plurality of pumps coupled to said optical information channel to produce an amplifier noise figure characteristic; and a control system comprising a detector configured to receive a signal representative of a backward-propagating noise spectrum and provide a plurality of detected signals, each of said detected signals being representative of the noise in an associated spectral segment of said signal representative of said backward-propagating noise signal, said control system further comprising a controller configured to provide a plurality of control signals in response to said detected signals, each of said control signals being provided to an associated one of said pumps to cause adjustment of at least one adjustable parameter of at least one of said pumps to achieve a desired wavelength-dependent noise figure characteristic encompassing said plurality of wavelengths.

13. The system of claim 12, wherein said at least one adjustable parameter comprises an output wavelength of said at least one of said pumps.

14. The system of claim 12, wherein said at least one adjustable parameter comprises an output power of said at least one of said pumps.

15. The system of claim 12, wherein said signal representative of said backward-propagating noise spectrum comprises a range of wavelengths, and wherein said desired noise figure characteristic encompasses said range of wavelengths.

16. The system of claim 12, wherein said signal representative of said backward-propagating noise spectrum comprises a range of wavelengths between about 1520 nm and about 1560 nm, and wherein said desired noise figure characteristic encompasses said range of wavelengths.

17. The system of claim 12, wherein said detector comprises a spectrum analyzer.

18. The system of claim 12, wherein the number of said control signals is greater than or equal to a total number of said adjustable parameters for said plurality of pumps.

19. The system of claim 12, wherein said spectral segments are substantially equal in length.

20. The system of claim 12, wherein said desired noise figure characteristic establishes a constant noise figure in each of said spectral segments.

21. The system of claim 12, wherein said detector comprises a splitter for splitting said signal representative of said backward-propagating noise spectrum onto a plurality of paths, each of said paths being coupled to an associated filter, each of said filters being configured to provide a different one of said associated spectral segments to an associated photo-detector, said photo detector each providing an associated one of said detected signals.

22. The system of claim 12, wherein said detector comprises a demultiplexer for separating said signal representative of said backward propagating noise spectrum into said spectral segments, each of said segments being provided on an associated optical path coupled to an associated photo-detector, said photo detectors each providing an associated one of said detected signals.

* * * * *